US010024477B2

(12) United States Patent
Villella

(10) Patent No.: US 10,024,477 B2
(45) Date of Patent: Jul. 17, 2018

(54) ANTI-ICE BUILDUP SYSTEM FOR ROOF VENT PIPES

(71) Applicant: Larry A. Villella, Pelican Rapids, MN (US)

(72) Inventor: Larry A. Villella, Pelican Rapids, MN (US)

(*) Notice: Subject to any disclaimer, the term of this patent is extended or adjusted under 35 U.S.C. 154(b) by 0 days.

(21) Appl. No.: 15/664,736

(22) Filed: Jul. 31, 2017

(65) Prior Publication Data

US 2018/0017198 A1  Jan. 18, 2018

Related U.S. Application Data

(63) Continuation-in-part of application No. 15/176,939, filed on Jun. 8, 2016, now Pat. No. 9,719,716.

(51) Int. Cl.
| | |
|---|---|
| *E03B 7/10* | (2006.01) |
| *F16L 53/00* | (2018.01) |
| *F16L 53/34* | (2018.01) |
| *E04D 13/10* | (2006.01) |
| *F16L 55/07* | (2006.01) |

(52) U.S. Cl.
CPC ............ *F16L 53/34* (2018.01); *E04D 13/103* (2013.01); *F16L 53/004* (2013.01); *F16L 55/07* (2013.01)

(58) Field of Classification Search
CPC .... E04D 2013/0413; E04D 2013/0418; E04D 2013/0409
USPC ............ 138/32–35; 52/302.1, 198; 137/526, 137/533.19
See application file for complete search history.

(56) References Cited

U.S. PATENT DOCUMENTS

| | | | | |
|---|---|---|---|---|
| 392,844 | A | | 11/1888 | Best |
| 1,999,277 | A | * | 4/1935 | Boosey ............... E04D 13/0409 210/163 |
| 2,464,052 | A | | 3/1949 | Numrich |
| 3,227,853 | A | * | 1/1966 | Gordon .................. E04D 13/08 138/33 |
| 3,293,407 | A | | 12/1966 | Ando |
| 3,754,118 | A | | 8/1973 | Booker |
| 3,784,785 | A | | 1/1974 | Noland |
| 4,524,262 | A | * | 6/1985 | Meyer ....................... E03F 5/08 137/297 |
| 4,799,713 | A | * | 1/1989 | Uglow ................ E04D 13/0409 210/163 |
| 4,815,769 | A | | 3/1989 | Hopperdietzel |
| 4,955,167 | A | * | 9/1990 | Holtgreve ................. F24F 7/02 454/275 |
| 5,080,007 | A | * | 1/1992 | Maheu ................... B21D 22/16 285/43 |
| 5,129,387 | A | | 7/1992 | Behrens |
| 5,143,407 | A | | 9/1992 | Cokeh |
| 5,214,266 | A | | 5/1993 | Halone |

(Continued)

*Primary Examiner* — Patrick F Brinson
(74) *Attorney, Agent, or Firm* — Neustel Law Offices

(57) ABSTRACT

An anti-ice buildup system for roof vent pipes that is easy to install and that prevents ice buildup in roof vent pipes. The anti-ice buildup system for roof vent pipes generally includes a first segment and a second segment extending downwardly from the first segment. At least a portion of the first segment is adapted to remain outside of a vent pipe and at least a portion of the second segment is adapted to extend downwardly through an upper opening in the vent pipe. The second segment is constructed of a thermal conductive material to conduct heat from the vent air and sunlight.

20 Claims, 23 Drawing Sheets

(56) References Cited

U.S. PATENT DOCUMENTS

| | | | |
|---|---|---|---|
| 5,234,582 A * | 8/1993 | Savoie | E04D 13/0409 |
| | | | 210/163 |
| 5,689,928 A * | 11/1997 | Rasksen | E04D 13/0409 |
| | | | 52/198 |
| 5,724,777 A * | 3/1998 | Hubbard | E04D 13/0409 |
| | | | 210/163 |
| 5,859,953 A | 1/1999 | Nickless | |
| 5,900,178 A | 5/1999 | Johnsen | |
| 6,097,008 A | 8/2000 | Mahin | |
| 6,244,006 B1 * | 6/2001 | Shue | E04D 13/147 |
| | | | 52/302.1 |
| 7,655,883 B2 | 2/2010 | Heise | |
| 2007/0207718 A1 | 9/2007 | Heise | |
| 2009/0145852 A1 | 6/2009 | Norgaard | |
| 2013/0065504 A1 * | 3/2013 | Alemao | F24F 7/00 |
| | | | 454/275 |
| 2014/0264116 A1 | 9/2014 | Cappadora | |
| 2016/0102885 A1 * | 4/2016 | Karkheck | H02S 20/23 |
| | | | 454/367 |

* cited by examiner

US 10,024,477 B2

ANTI-ICE BUILDUP SYSTEM FOR ROOF VENT PIPES

CROSS REFERENCE TO RELATED APPLICATIONS

The present application is a continuation-in-part of U.S. application Ser. No. 15/176,939 filed on Jun. 8, 2016. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to an anti-ice buildup system for roof vent pipes that is easy to install and that prevents ice buildup in roof vent pipes.

Related Art

Any discussion of the related art throughout the specification should in no way be considered as an admission that such related art is widely known or forms part of common general knowledge in the field.

Vent pipes on the roof of buildings (e.g. houses) are used to vent undesirable gases and odors out of the building. One example of a vent pipe is a sewer vent pipe. FIGS. 1a and 1b of the drawings illustrate an exemplary sewer vent pipe that provides ventilation to the sewer pipe system in the building to prevent a vacuum from being formed in the sewer drain system and to allow harmful gases and unpleasant odors to be drawn out of the building. The sewer gas that is vented through the sewer vent pipe is warmer than the air outside of the building during the winter months. However, during very cold weather or other conditions, the interior passage of the sewer vent pipe accumulates ice buildup which narrows the passage for ventilation and eventually the entire passage of the sewer vent pipe may become completely closed with ice buildup creating a hazardous situation (e.g. sewer gas backup into the interior of the building) and undesirable odors for occupants of the building. It is therefore important to ensure that the sewer vent pipe remains open at all times to provide adequate ventilation for the sewer pipe system of the building.

SUMMARY

An example embodiment of the present invention is directed to an anti-ice buildup system for roof vent pipes. The anti-ice buildup system for roof vent pipes includes a first segment and a second segment extending downwardly from the first segment. At least a portion of the first segment is adapted to remain outside of a vent pipe and at least a portion of the second segment is adapted to extend downwardly through an upper opening in the vent pipe. The second segment is constructed of a thermal conductive material to conduct heat from the vent air and sunlight.

There has thus been outlined, rather broadly, some of the features of the anti-ice buildup system for roof vent pipes in order that the detailed description thereof may be better understood, and in order that the present contribution to the art may be better appreciated. There are additional features of the anti-ice buildup system for roof vent pipes that will be described hereinafter and that will form the subject matter of the claims appended hereto. In this respect, before explaining at least one embodiment of the anti-ice buildup system for roof vent pipes in detail, it is to be understood that the anti-ice buildup system for roof vent pipes is not limited in its application to the details of construction or to the arrangements of the components set forth in the following description or illustrated in the drawings. The anti-ice buildup system for roof vent pipes is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

An example anti-ice buildup system for roof vent pipes generally comprises a first segment 22 and a second segment 26 extending downwardly from the first segment 22. At least a portion of the first segment 22 is adapted to remain outside of a vent pipe 14 and at least a portion of the second segment 26 is adapted to extend downwardly through an upper opening 16 in the vent pipe 14. The second segment 26 is constructed of a thermal conductive material to conduct heat from the vent air and sunlight.

B. First and Second Segments

Figure 1A:
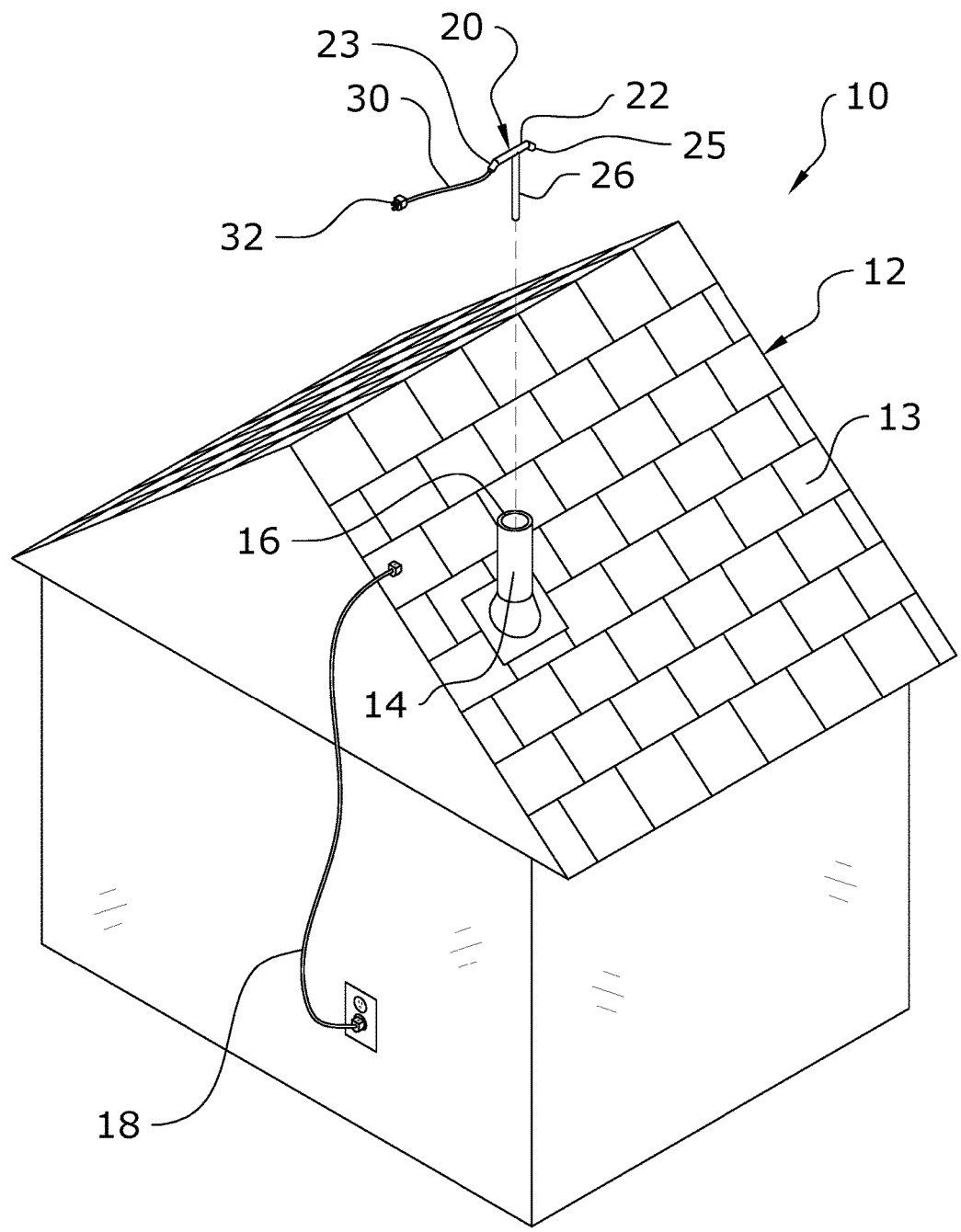
FIG. 1a is an exploded perspective view of an anti-ice buildup system for roof vent pipes positioned above a vent pipe in accordance with an example embodiment.
Figure 1B:
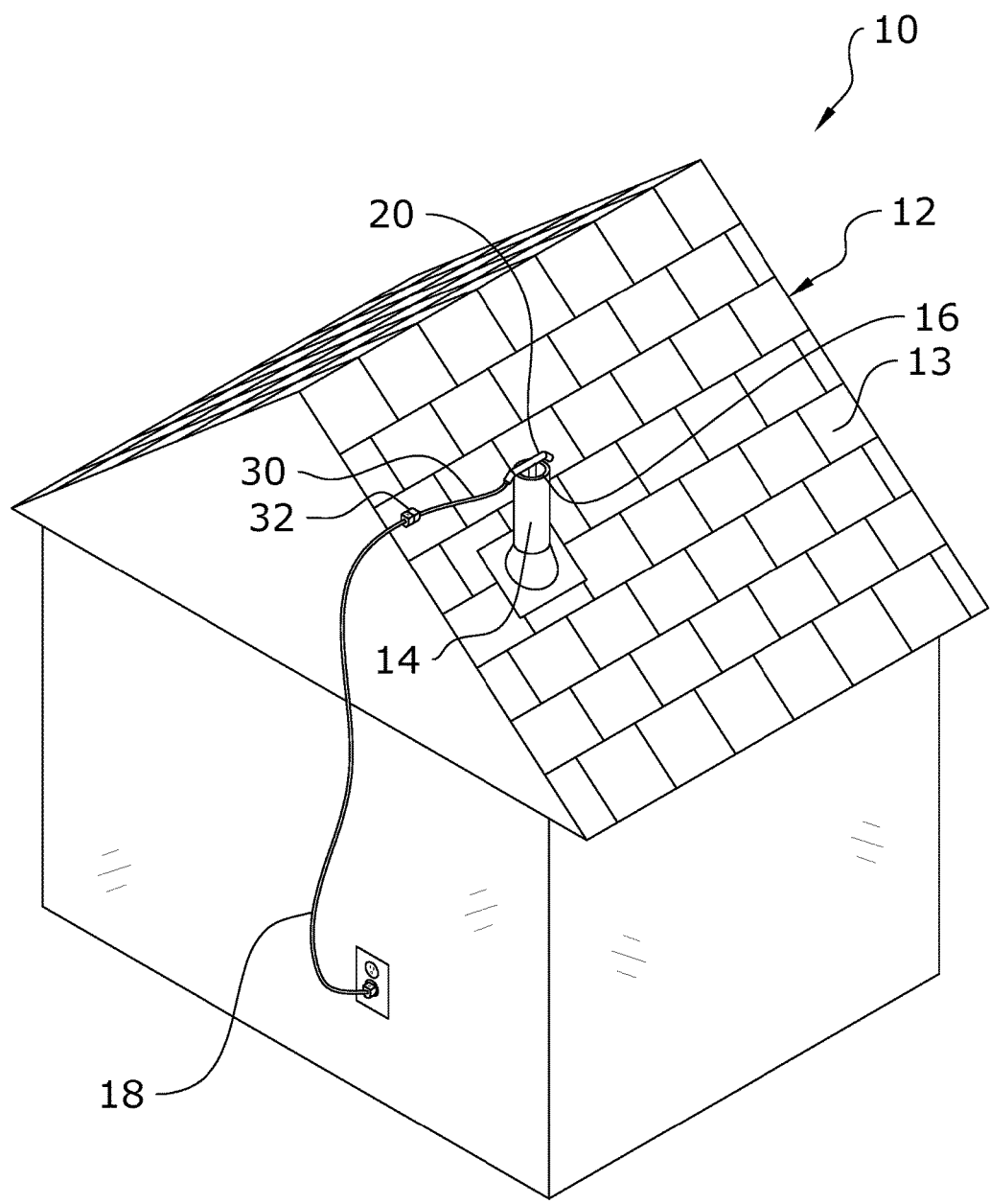
FIG. 1b is a perspective view of the anti-ice buildup system for roof vent pipes positioned above a vent pipe in accordance with an example embodiment.
Figure 2:
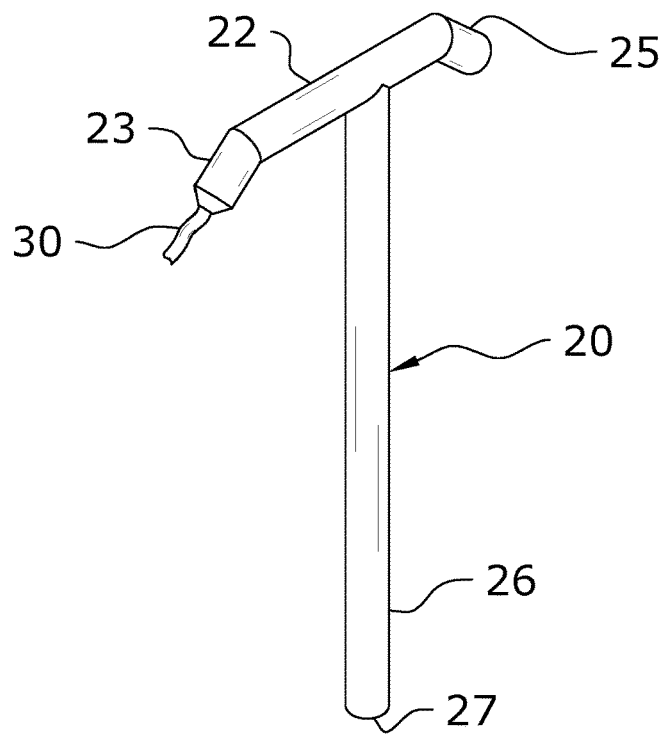
FIG. 2 is an upper perspective view of a first embodiment of the anti-ice buildup system for roof vent pipes.
Figure 3:
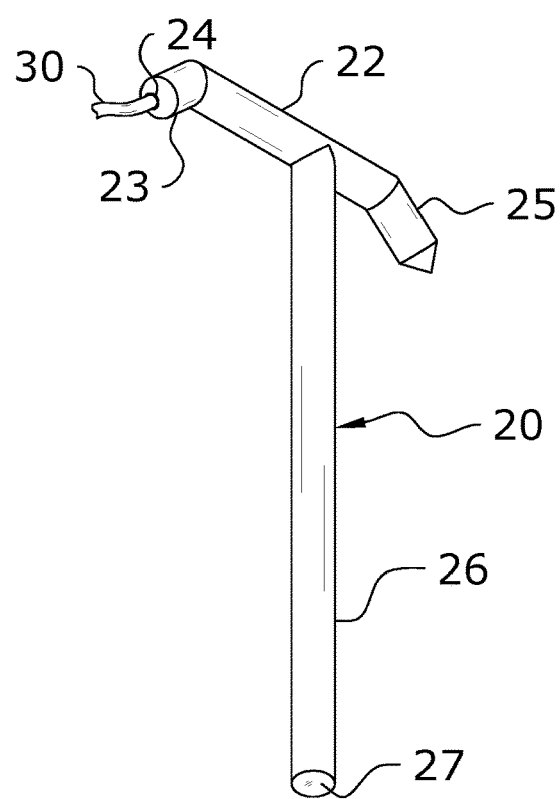
FIG. 3 is a lower perspective view of the first embodiment.
Figure 4:
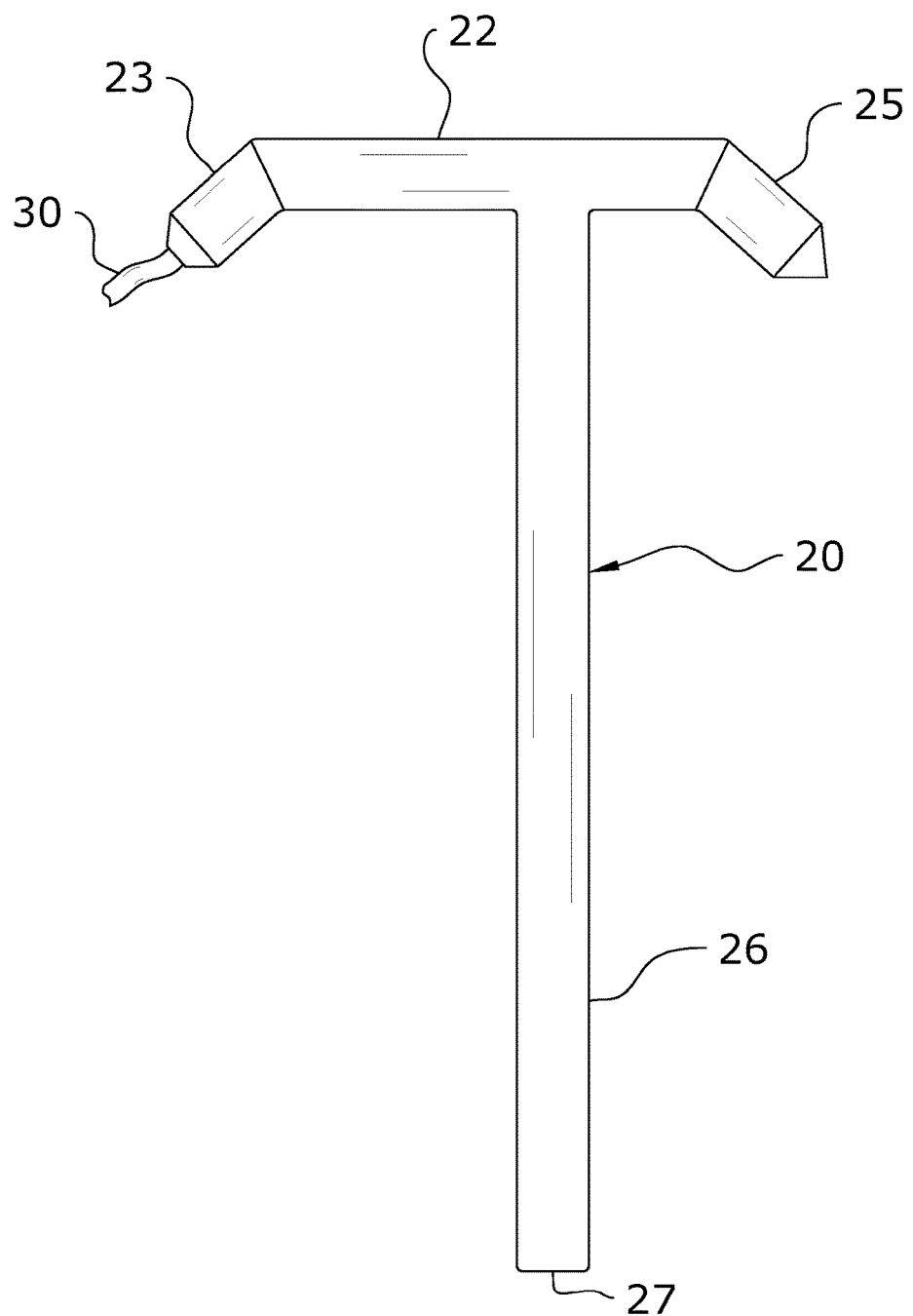
FIG. 4 is a front view of the first embodiment.
Figure 5:
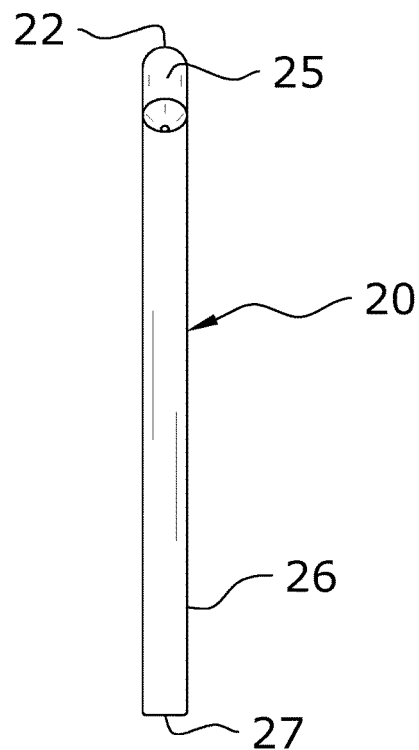
FIG. 5 is a right side view of the first embodiment.
Figure 6:
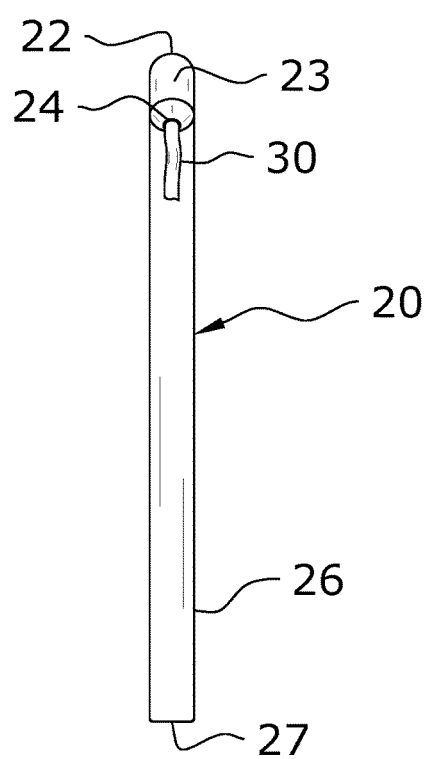
FIG. 6 is a left side view of the first embodiment.
Figure 7:
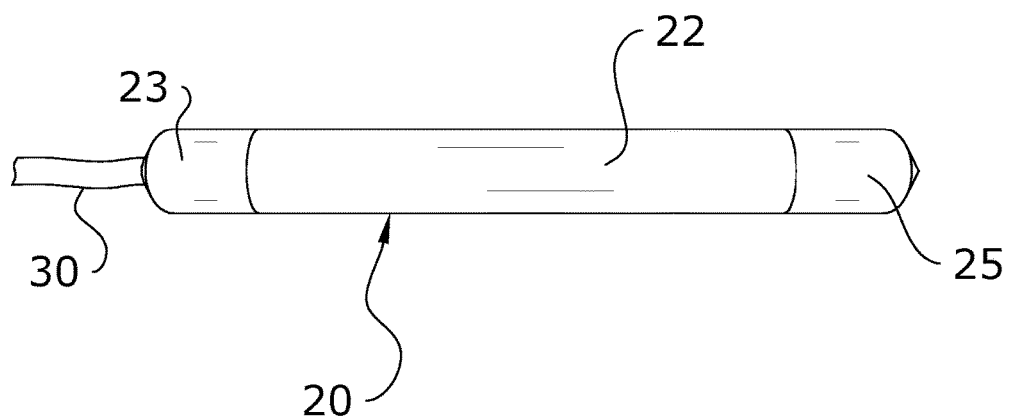
FIG. 7 is a top view of the first embodiment.
Figure 8:
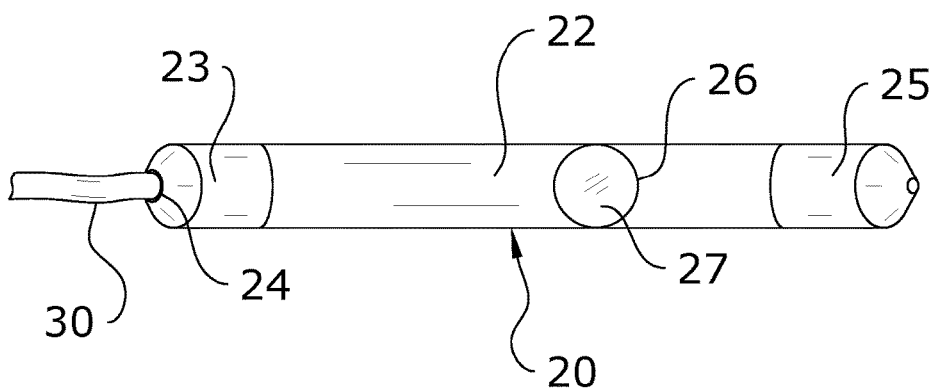
FIG. 8 is a bottom view of the first embodiment.
Figure 9:
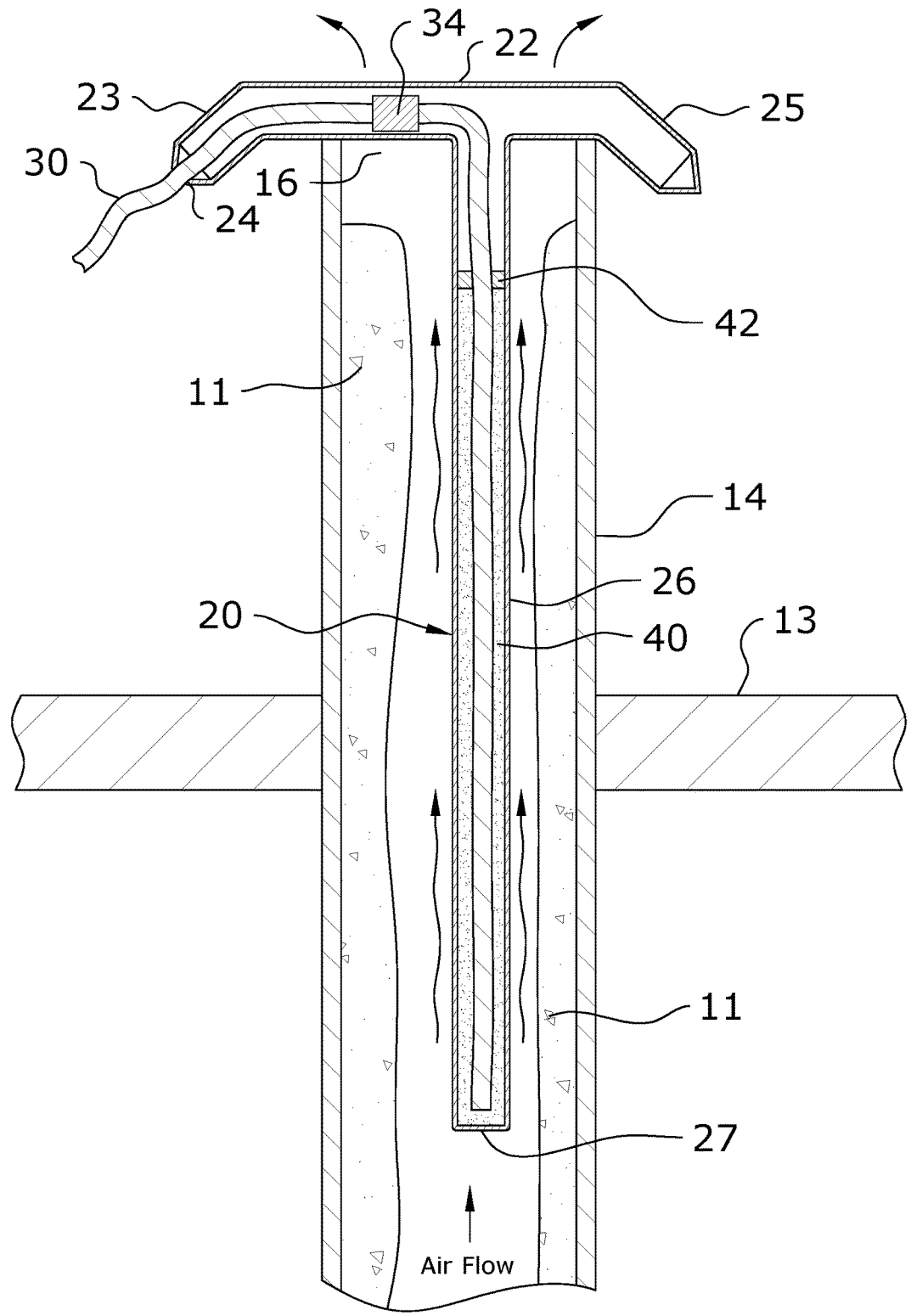
FIG. 9 is a cross sectional view of the first embodiment positioned within a vent pipe to prevent ice buildup within the interior of the vent pipe.
Figure 10:
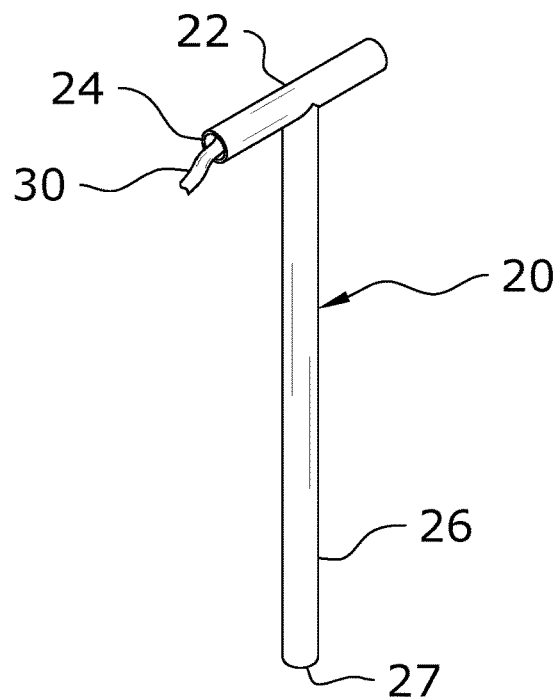
FIG. 10 is an upper perspective of a second embodiment of the of the anti-ice buildup system for roof vent pipes.
Figure 24:
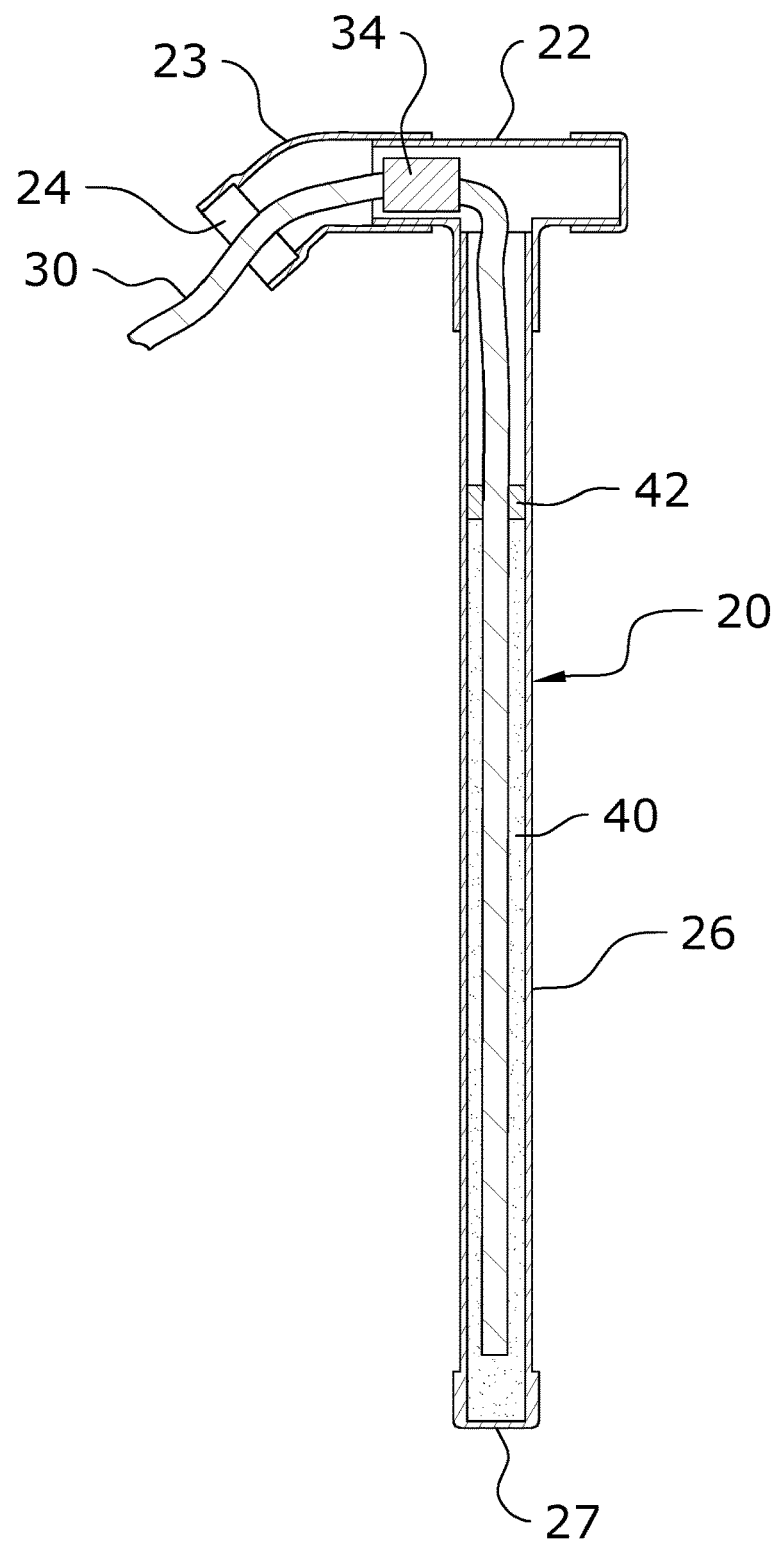
FIG. 24 is a cross sectional view taken along line 24-24 of FIG. 22.
Figure 25:
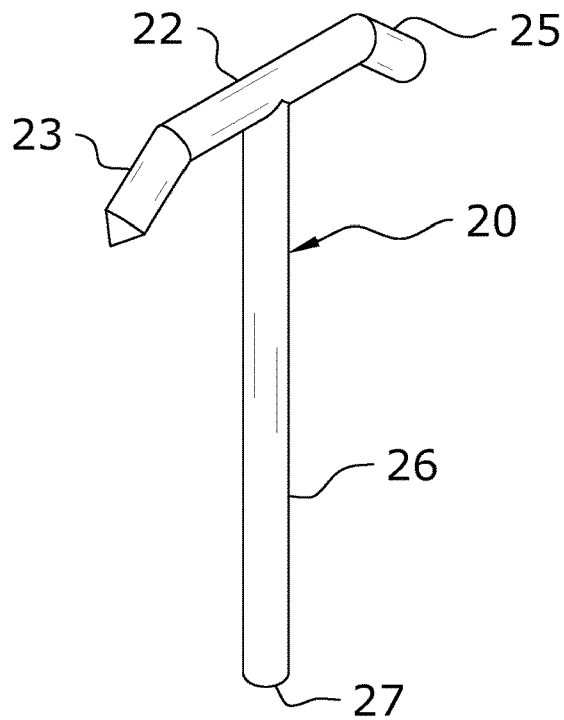
FIG. 25 is an upper perspective of a fifth embodiment of the of the anti-ice buildup system for roof vent pipes.
Figure 26:
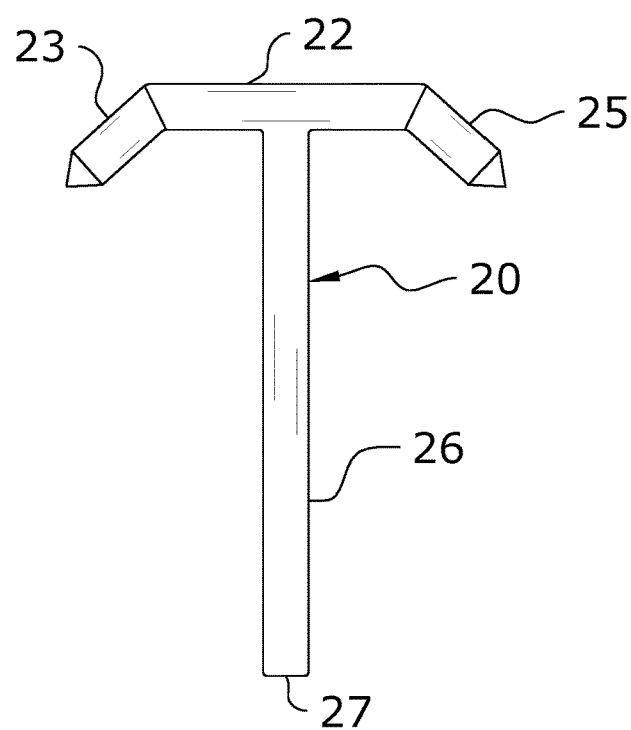
FIG. 26 is a front view of the fifth embodiment.
Figure 27:
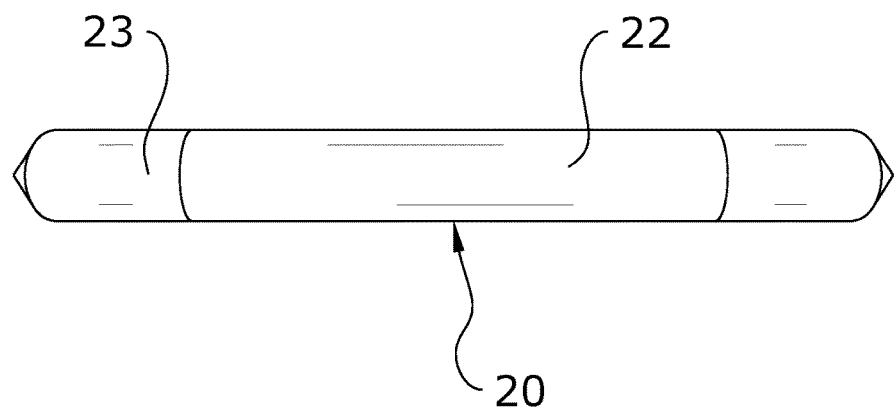
FIG. 27 is a top view of the fifth embodiment.
Figure 28:
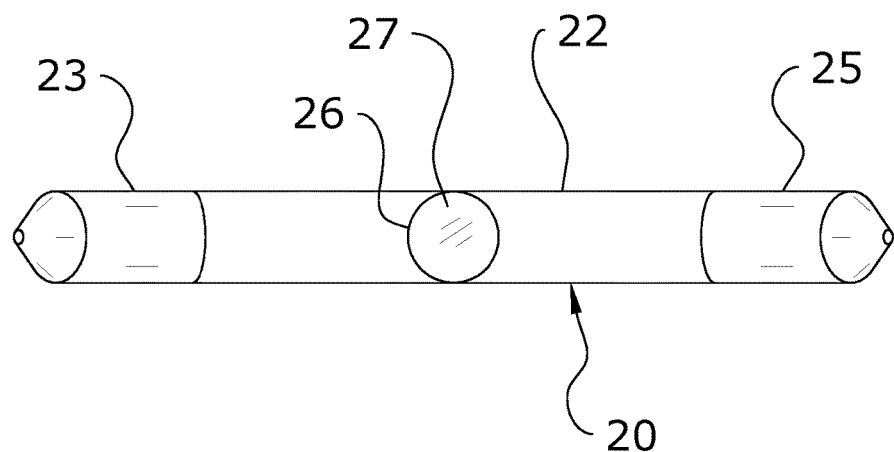
FIG. 28 is a bottom view of the fifth embodiment.

The thermal conductor device 20 is used to prevent ice buildup 11 within the interior of a roof 13 vent pipe 14 as illustrated by a first embodiment in FIGS. 1a, 1b and 9 of the drawings. The thermal conductor device 20 is comprised of a device that has a first segment 22 having a first length and a second segment 26 having a second length. The first segment 22 and/or the second segment 26 are preferably comprised of a tubular structure (with one or more of the opposing ends either open or closed) but may be comprised of a non-tubular structure (e.g. solid). When the first segment 22 and the second segment 26 are comprised of a tubular structure, a length of heat tape 30 may be positioned within a portion of the first segment 22 and the second segment 26 as illustrated in FIGS. 9 and 24 of the drawings. The cross sectional shape of the first segment 22 and the second segment 26 is preferably circular.

Figure 29:
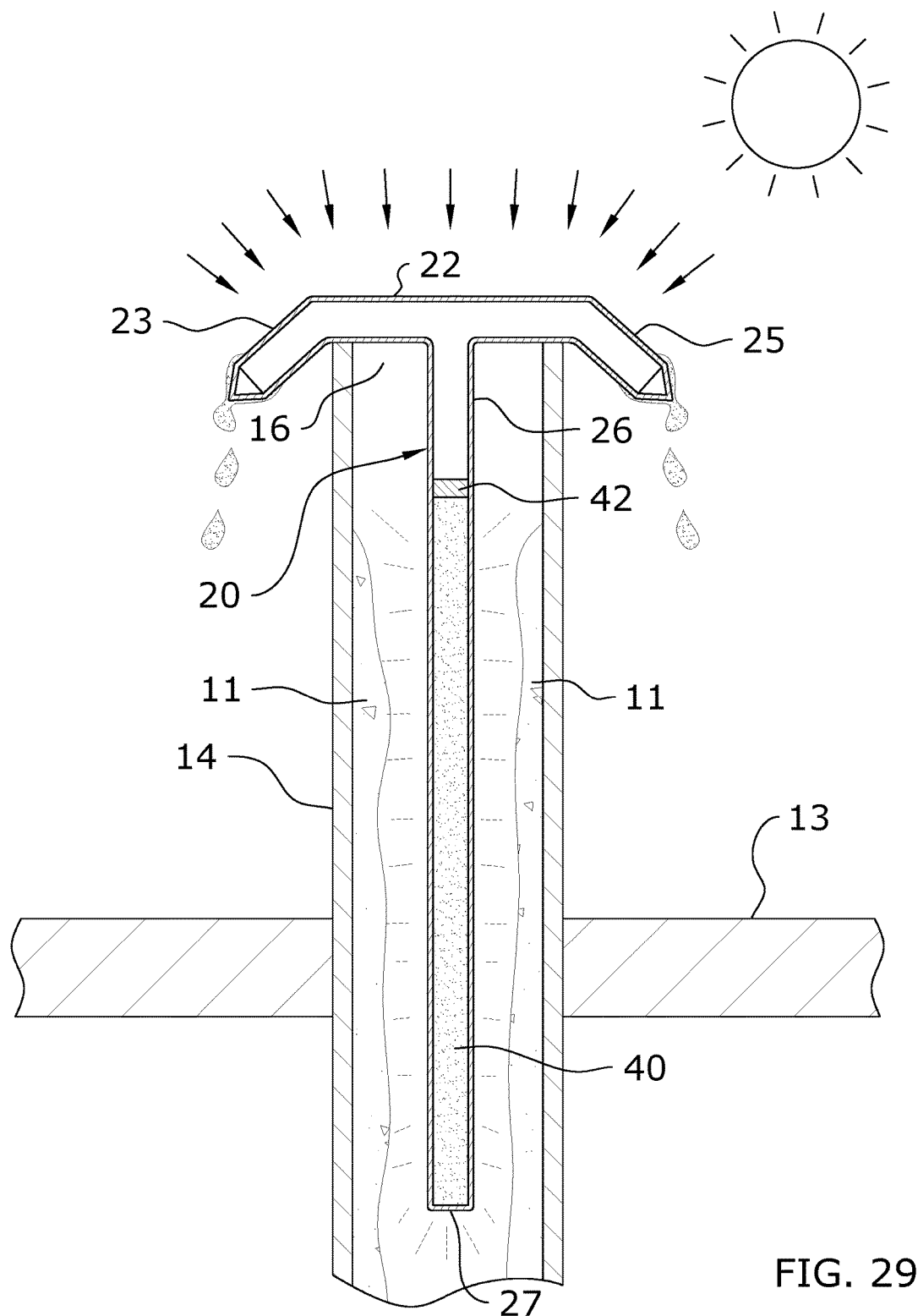
FIG. 29 is a cross sectional view of the fifth embodiment positioned within a vent pipe in a roof.

While it is preferable that a substantial portion or the entire portion of the first segment 22 remains outside of the vent pipe 14, at least a portion of the first segment 22 is adapted to remain outside of a vent pipe 14 when supporting the second segment 26 of the thermal conductor device 20. In the various embodiments illustrated in the drawings, the first length of the first segment 22 is greater than a width of the upper opening 16 of the vent pipe 14 to allow the first segment 22 to rest upon the upper end of the vent pipe 14 without accidentally falling into the vent pipe 14 as illustrated in FIGS. 1b, 9 and 29 of the drawings. The first segment 22 may be comprised of various other structures capable of attaching to the upper end of the vent pipe 14 to support the second segment 26 within an upper portion of the vent pipe 14 near or within the upper opening 16 (e.g. a hook).

Figure 20:
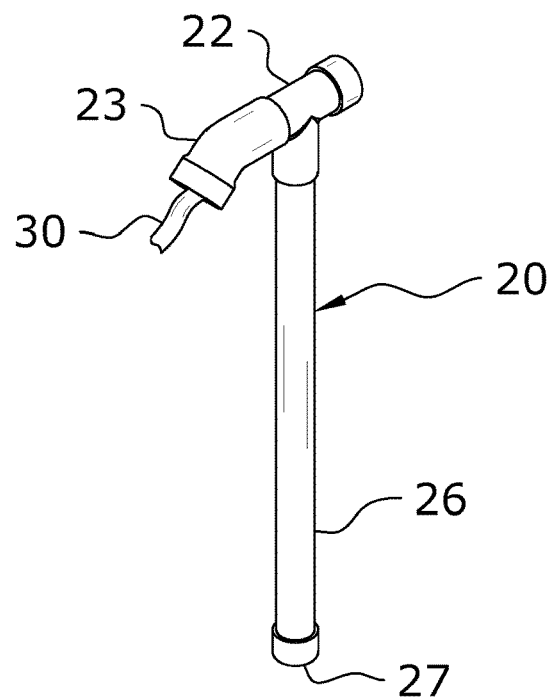
FIG. 20 is an upper perspective of a fourth embodiment of the of the anti-ice buildup system for roof vent pipes.
Figure 21:
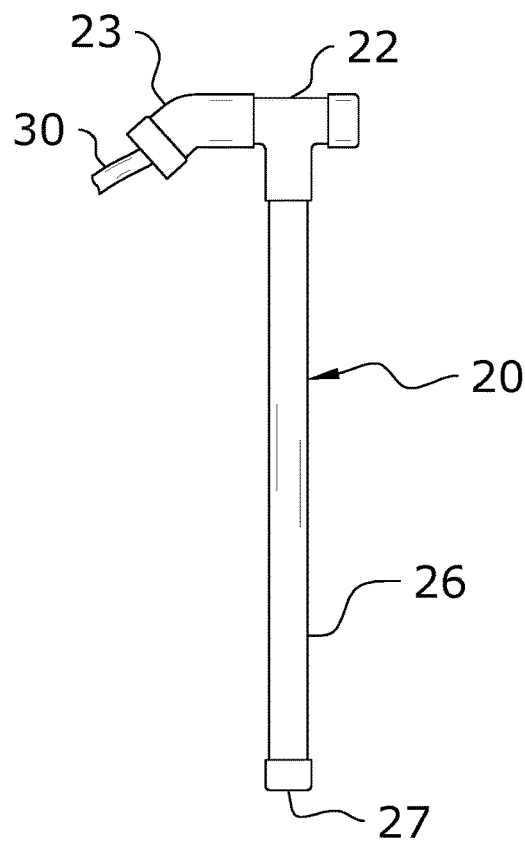
FIG. 21 is a front view of the fourth embodiment.
Figure 22:
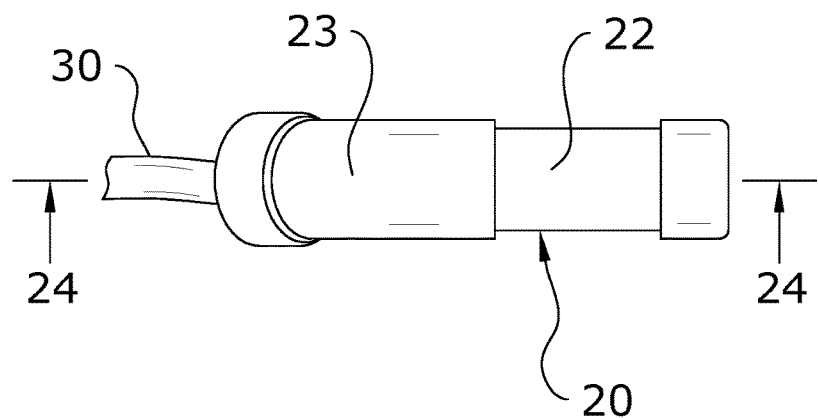
FIG. 22 is a top view of the fourth embodiment.
Figure 23:
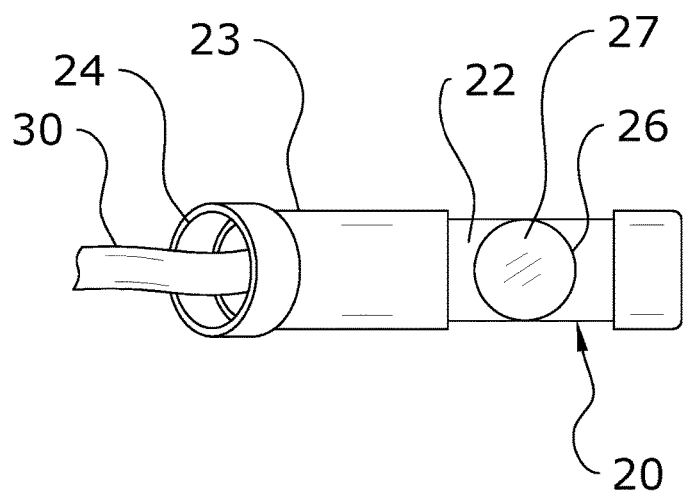
FIG. 23 is a bottom view of the fourth embodiment.

The second segment 26 extends downwardly from the first segment 22 wherein the first segment 22 supports the second segment 26 when the second segment 26 is positioned within the interior of the vent pipe 14. At least a portion of the second segment 26 is adapted to extend downwardly through an upper opening 16 in the vent pipe 14. It is preferable that the entire portion or substantial portion of the second segment 26 is positioned within the interior passage of the vent pipe 14 as illustrated in FIGS. 1b, 9 and 20 of the drawings. The second segment 26 is further preferably substantially concentrically positioned and supported within the vent pipe 14.

Figure 11:
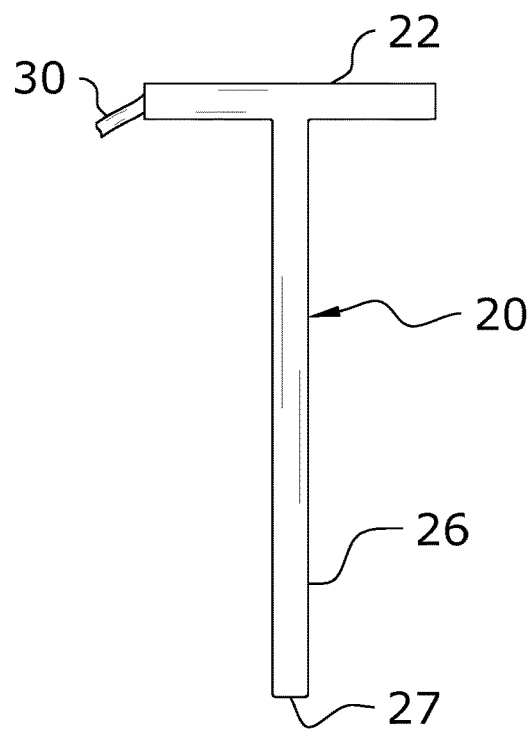
FIG. 11 is a front view of the second embodiment.
Figure 12:
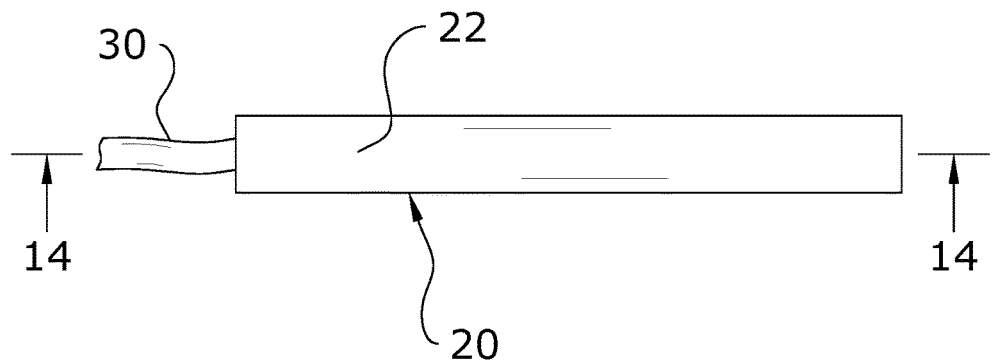
FIG. 12 is a top view of the second embodiment.
Figure 13:
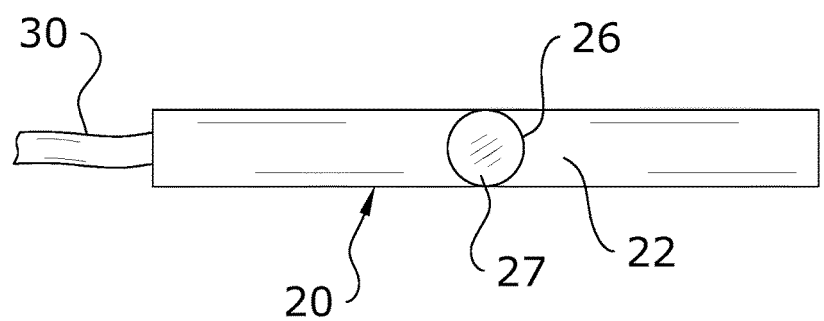
FIG. 13 is a bottom view of the second embodiment.
Figure 14:
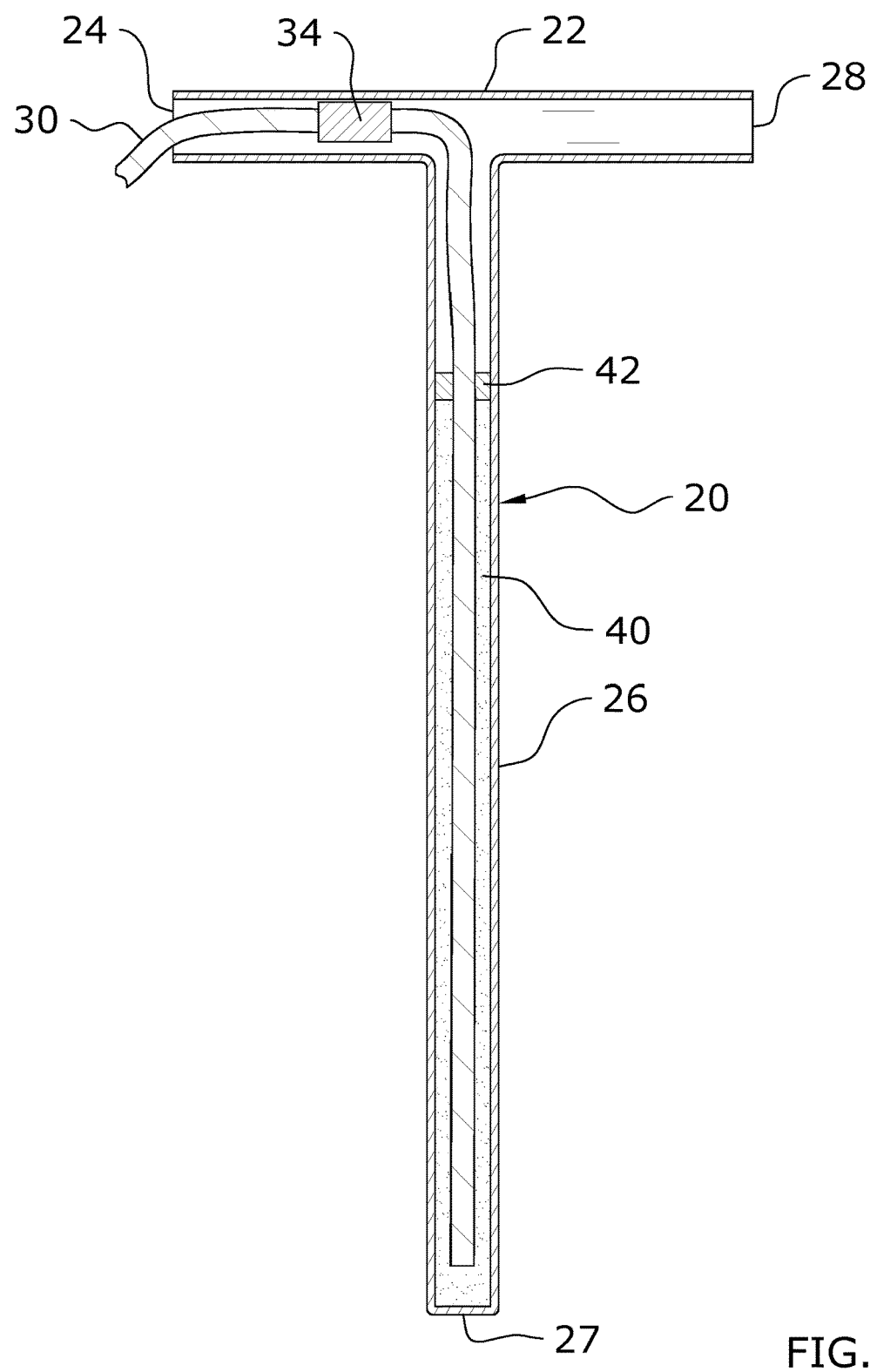
FIG. 14 is a cross sectional view taken along line 14-14 of FIG. 12.
Figure 15:
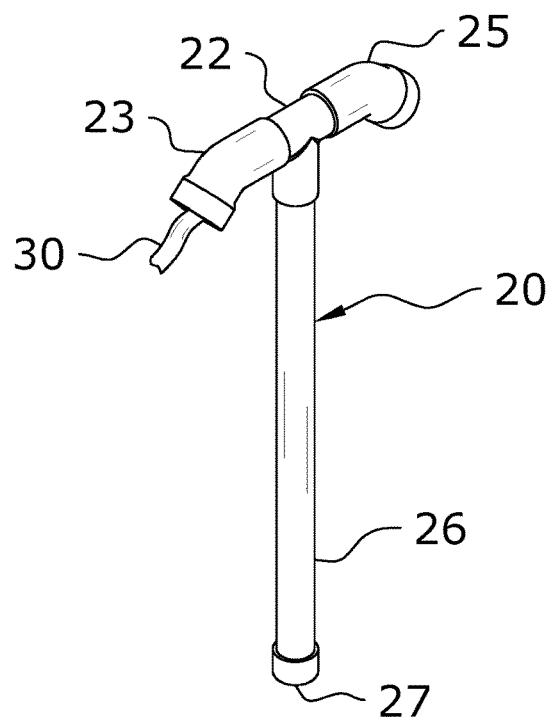
FIG. 15 is an upper perspective of a third embodiment of the of the anti-ice buildup system for roof vent pipes.
Figure 16:
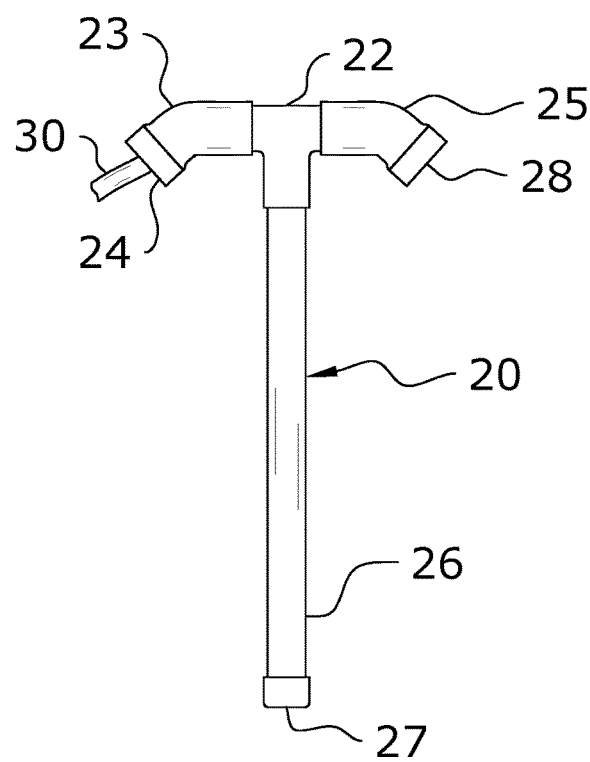
FIG. 16 is a front view of the third embodiment.
Figure 17:
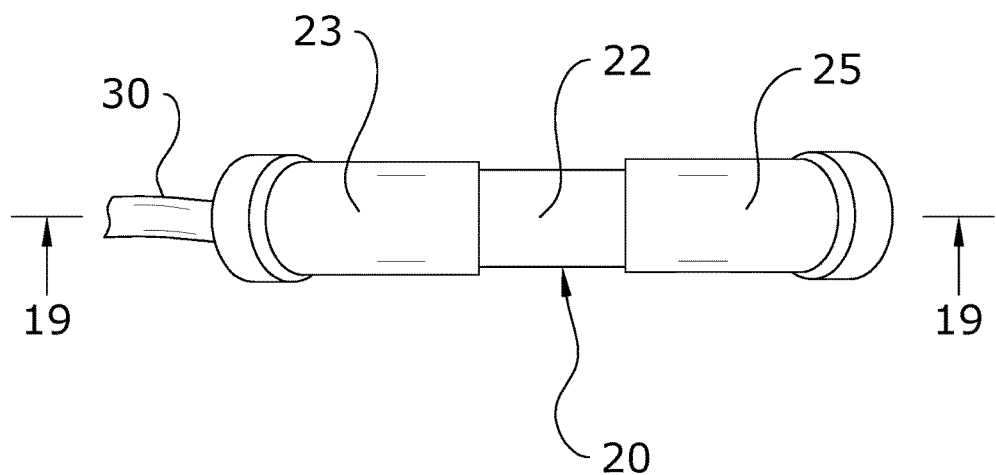
FIG. 17 is a top view of the third embodiment.
Figure 18:
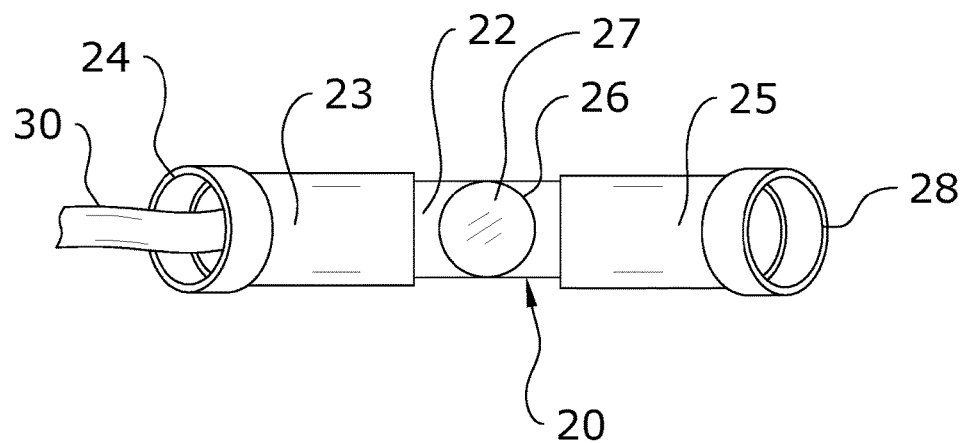
FIG. 18 is a bottom view of the third embodiment.
Figure 19:
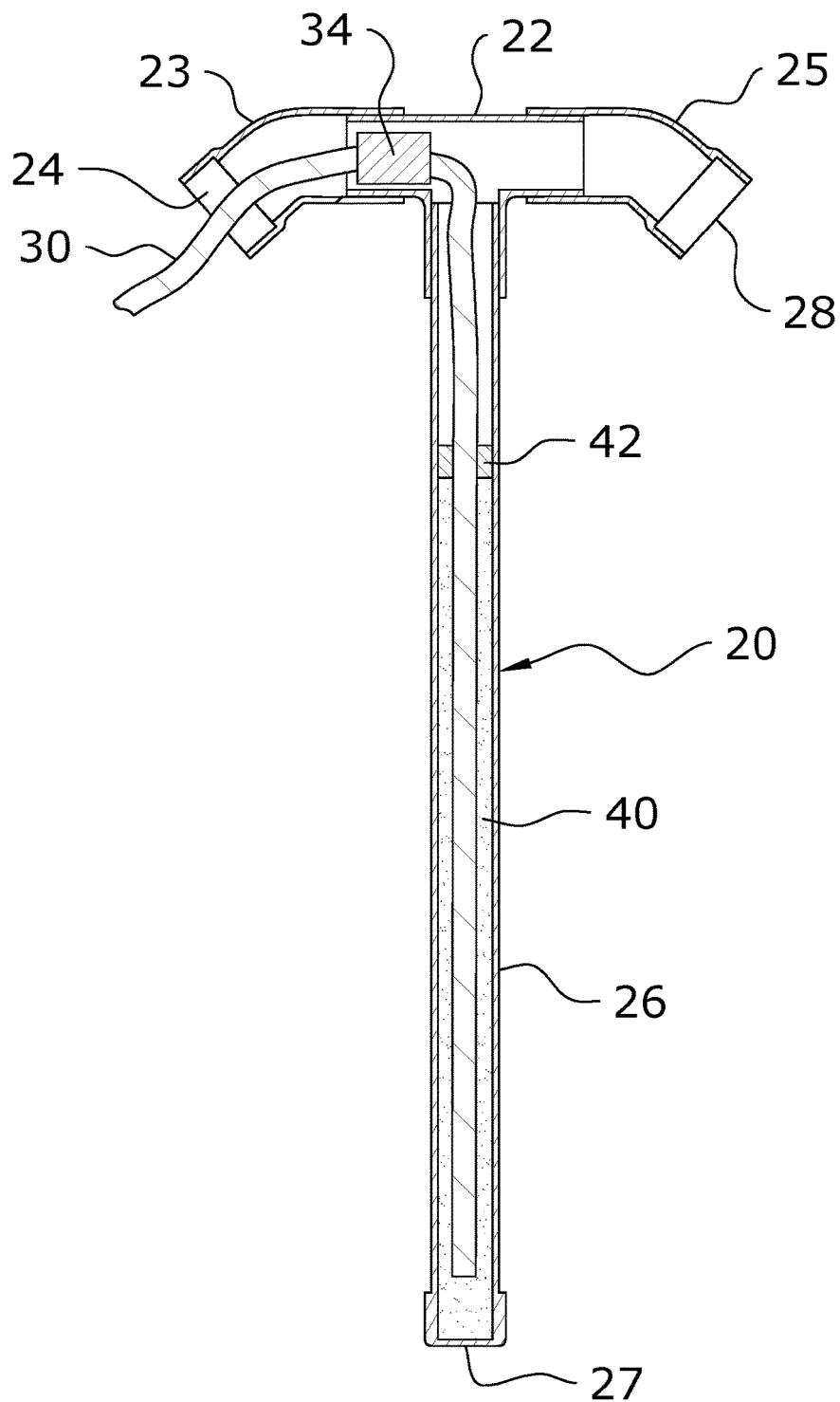
FIG. 19 is a cross sectional view taken along line 19-19 of FIG. 17.

The second segment 26 preferably extends downwardly from the first segment 22 such that the second segment 26 is supported within the interior of the upper portion of the vent pipe 14 without touching the sidewalls of the vent pipe 14 (it can be appreciated that the second segment 26 may make contact with the sidewalls). The second segment 26 further preferably extends downwardly in a substantially transverse manner from the first segment 22 thereby forming a substantially T-shaped structure. The second segment 26 preferably extends from a substantially center location of the first segment 22 so that the first segment 22 is divided into substantially equal left and right portions as illustrated in FIGS. 11 and 14 of the drawings.

The first segment 22 and the second segment 26 preferably form a substantially T-shaped structure as shown in the various embodiments of the present invention. The first segment 22 and/or the second segment 26 are substantially elongated and straight. It can be appreciated that non-T-shaped structures may be formed and the first segment 22 and the second segment 26 may be comprised of configurations that are not elongated or straight. Even though not required, the second length of the second segment 26 is preferably at least two times greater than the first length of the first segment 22 as illustrated in the various embodiments. In one example embodiment, the first segment 22 is approximately 8 inches in width with the second segment 26 approximately 16 inches in length.

One or more of the opposing ends of the first segment 22 may be closed or open. When one or more of the opposing ends are open, a length of heat tape 30 may be inserted into the opening. FIGS. 2 through 8 illustrate an embodiment having a first opening 24 within a first end of the first segment 22 that receives the heat tape 30 with the second end of the first segment 22 closed. FIGS. 12 through 18 illustrate several embodiments where the first end and the second end of the first segment 22 include a first opening 24 and a second opening 28 respectively that allow for the passage of outside air through the tubular structure of the first segment 22. FIGS. 26 through 29 illustrate the first end and the second end of the first segment 22 closed along with the opposing ends of the second segment 26 closed. The second segment 26 has a lower end 27 opposite of the first segment 22. The lower end 27 of the second segment 26 is preferably closed but may be open depending upon the application.

The first segment 22 may be comprised of a straight structure without substantial curvature or the first segment 22 may include a first angled end 23 and a second angled end 25 that both extend downwardly at an angle to catch upon the outside of the vent pipe 14 as illustrated in FIGS. 1b, 9 and 29 of the drawings. The opposing angled ends may be constructed at various angles and may have openings or closed ends. FIGS. 20 through 24 illustrate the usage of a first angled end 23 with no opposing angled end.

At least the second segment 26 is constructed of a thermal conductive material to conduct heat from warmer air passing upwardly through the vent pipe 14 (e.g. warm sewer gas). The first segment 22 is also preferably comprised of a thermal conductive material to conduct heat from the warmed gas from the vent pipe 14 and sunlight, however, the first segment 22 may be comprised of a non-thermal conductive material (e.g. plastic). The thermal conductive material is preferably comprised of metal such as, but not limited to, copper. Copper is a preferred thermal conductive material because of the non-corrosive and heat conduction qualities.

The first segment 22 and the second segment 26 are preferably comprised of a unitary structure as illustrated in FIGS. 1 through 14 and 25 through 29 of the drawings. However, the first segment 22 and the second segment 26 may be attached to one another with fasteners (e.g. adhesive, bolts, screws, couplers). For example, the first segment 22 and the second segment 26 may be comprised of copper pipe tubing sections connected together with copper pipe connectors and the like as illustrated in FIGS. 15 through 24 of the drawings. Various other structures may be used to construct the thermal conductor device 20.

C. Antifreeze

The first segment 22 and/or the second segment 26 may be filled with gas or a liquid. It is preferable that at least a portion (e.g. 80% or higher) of the second segment 26 is filled with a volume of liquid antifreeze 40 that does not freeze to assist in storing and transferring heat. The liquid antifreeze 40 may fill the entire volume or a substantial volume of the first segment 22 and the second segment 26. A sealant 42 (e.g. hot glue, epoxy, rubber seal) within the interior of the second segment 26 is positioned above the volume of liquid antifreeze 40 to prevent the liquid antifreeze 40 from entering the first segment 22 as illustrated in FIGS. 9, 19, 24 and 29. The antifreeze 40 may be comprised of any water-based liquid that has a freezing point below 32 degrees Fahrenheit. The antifreeze 40 may fill the entire second segment 26 and the antifreeze 40 may also fill a portion or the entire interior of the first segment 22.

D. Heat Tape

All of the various embodiments of the present invention may be used alone within the vent pipe 14 or in combination with heat tape 30. The heat tape 30 may be comprised of any elongated electrical device that heats when connected to an electric power source to provide supplemental heat to the thermal conductor device 20 for use in extremely cold weather conditions (e.g. −10 degrees Fahrenheit).

The heat tape 30 is preferably within the interior of the thermal conductor device 20 but may be positioned externally of the thermal conductor device 20. The heating portion of the heat tape 30 is preferably positioned within the antifreeze 40 and the thermostat 34 is positioned within the first segment 22 out of the antifreeze 40. The heat tape 30 is extended through an opening within the first segment 22 (or an opening in the second segment 26) such that a length of the heat tape 30 is extends through the opening into an interior of the first segment 22 and second segment 26. The heat tape 30 preferably has an illuminated connector end 32 that illuminates when electrical power is provided to the heat tap. The heat tape 30 may be comprised of various well-known heating products that are elongated. The heat tape 30 further includes a thermostat 34 that is preferably positioned within an upper portion of the thermal conductor device 20 and further the thermostat 34 is preferably positioned within the first segment 22 as illustrated in FIGS. 9, 14, 19 and 24 of the drawings. The heat tape 30 preferably extends through the sealant 42 in a sealed manner and into the antifreeze 40 to heat the antifreeze 40 along with the second segment 26.

E. Operation of Embodiment

In use, the user positions the second segment 26 into the upper opening 16 of the vent pipe 14 within a roof 13 of a building 12 as illustrated in FIGS. 1a, 1b, 9 and 29 of the drawings. If heat tape 30 is used with the thermal conductor device 20, then the user electrically connects the heat tape 30 with an extension cord 18 with the opposite end of the extension cord 18 electrically connected to an electrical outlet (or directly connecting the heat tape 30 to an electrical power source). As the warmer air from the building 12 rises through the vent pipe 14, the warm air passes over the thermal conductor device 20 which conducts a portion of the heat from the warm air flow as illustrated in FIG. 9 of the drawings. In addition, the first segment 22 and a portion of the second segment 26 conduct heat from any sunlight the same are exposed to. The conducted heat from the air flow is stored within the heat conductive material and any air (or liquid) within the interior of the thermal conductor device 20. When the air flow through the vent pipe 14 is reduced during cold air environments (e.g. below 32 degrees Fahrenheit), then the air around the thermal conductor device 20 conducts the heat from the thermal conductor device 20 to prevent the accumulation of ice buildup 11. When the outside air temperature becomes extremely cold (e.g. −10 degrees Fahrenheit), the user may turn on the heat tape 30 to increase the temperature of the thermal conductor device 20 thereby further melting any ice buildup 11 within the exterior wall of the vent pipe 14 thereby ensuring an air passage within the vent pipe 14. This process continues to ensure that the interior passage of the vent pipe 14 remains open at all times to prevent freezing of the vent pipe 14.

F. Alternative Embodiment

Figure 30:
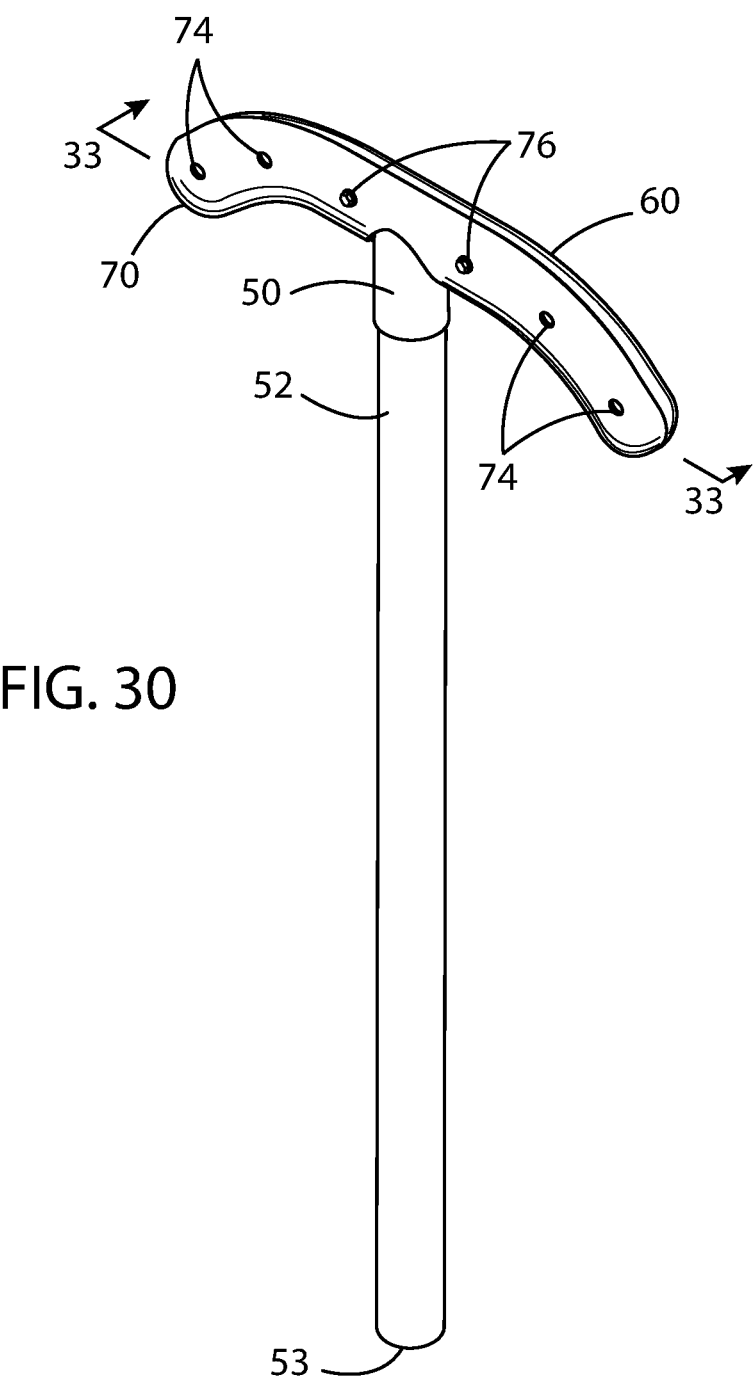
FIG. 30 is an upper perspective view of a sixth embodiment.
Figure 31:
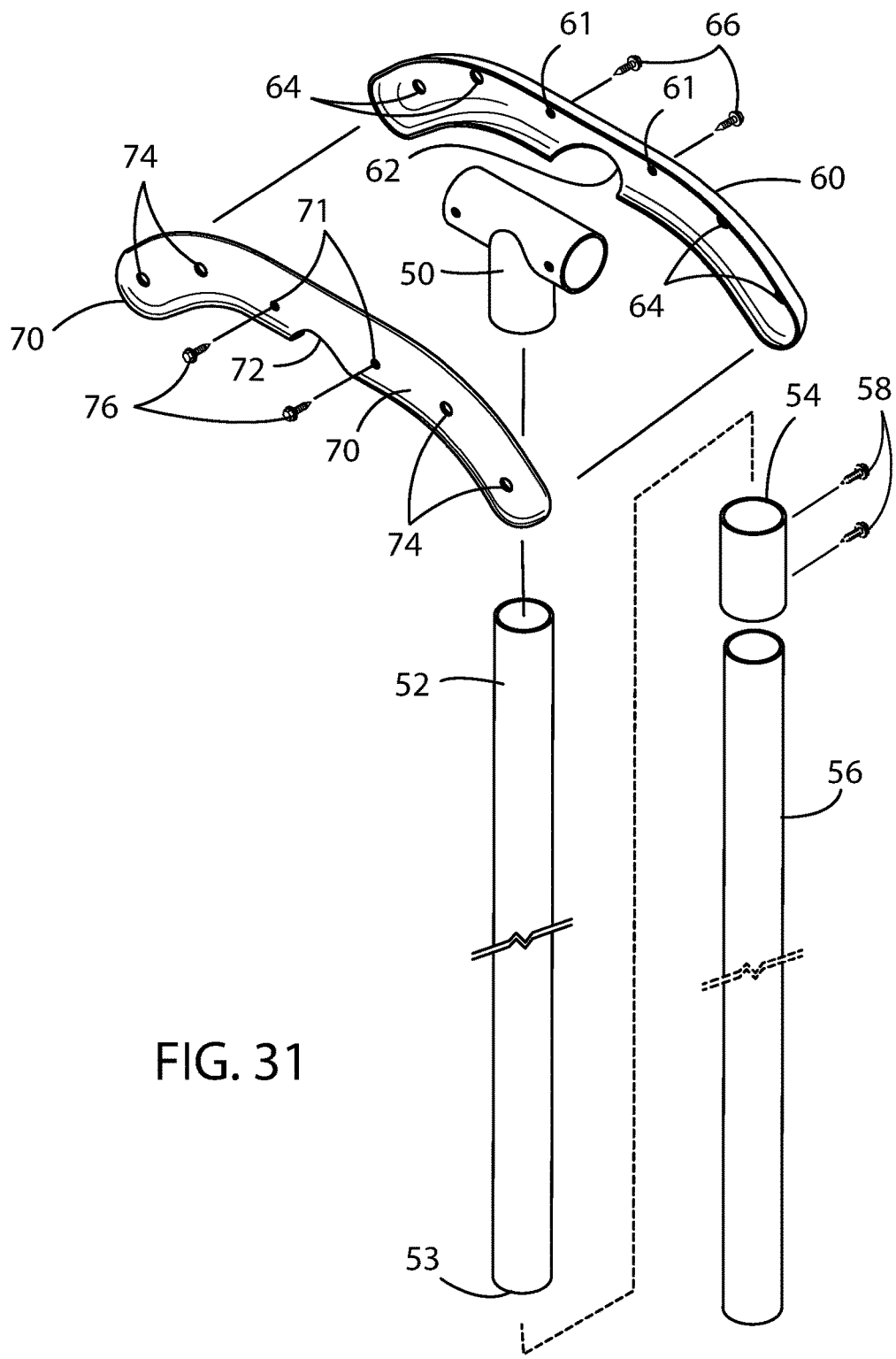
FIG. 31 is an exploded upper perspective view of the sixth embodiment.
Figure 32:
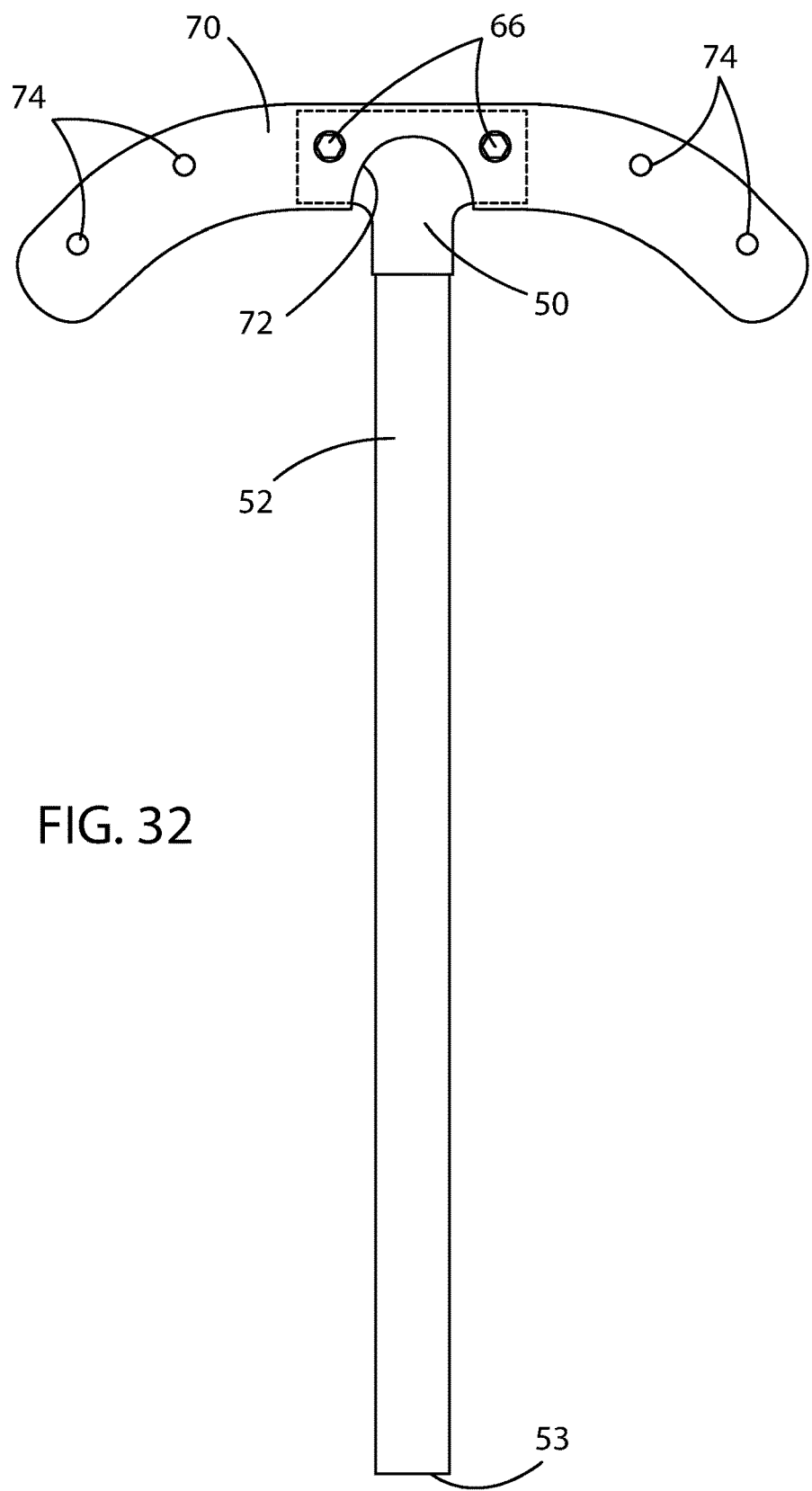
FIG. 32 is a front view of the sixth embodiment.
Figure 33:
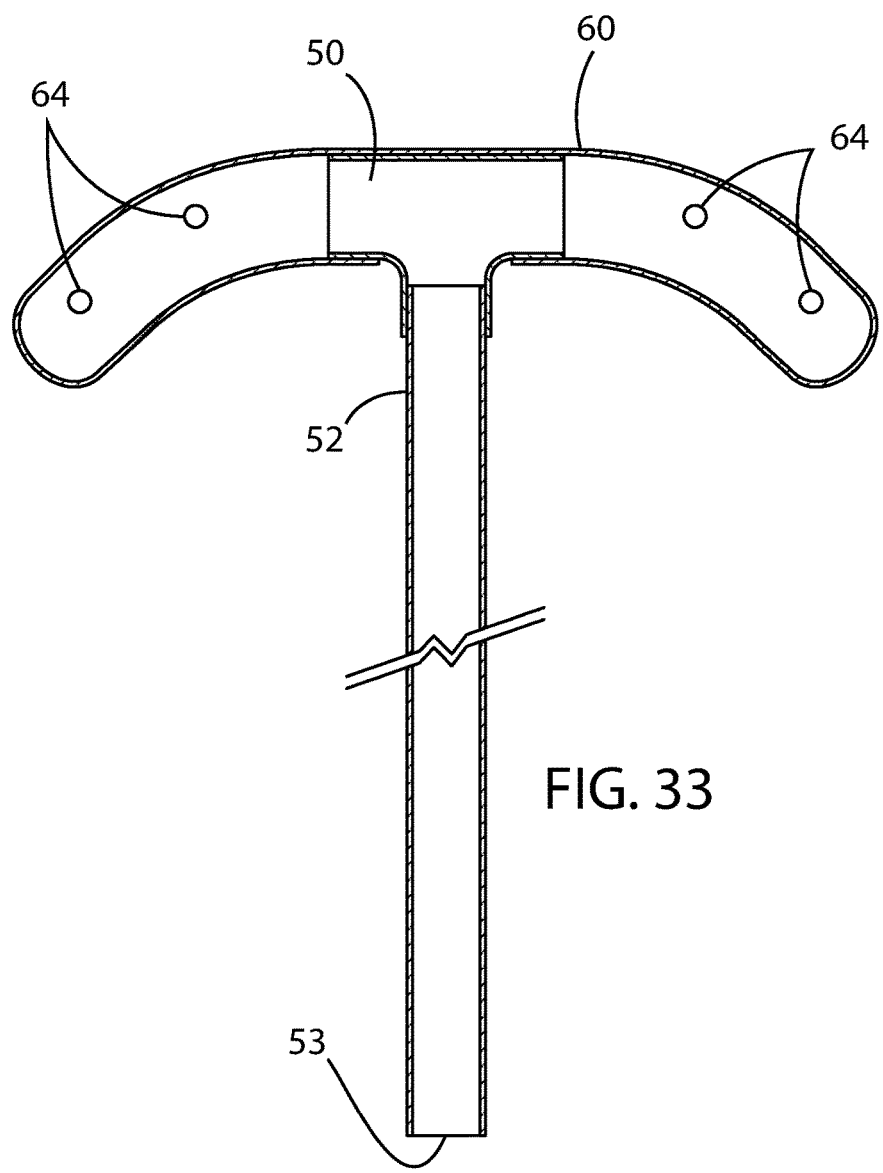
FIG. 33 is a cross sectional view taken along line 33-33 of FIG. 30.
Figure 34:
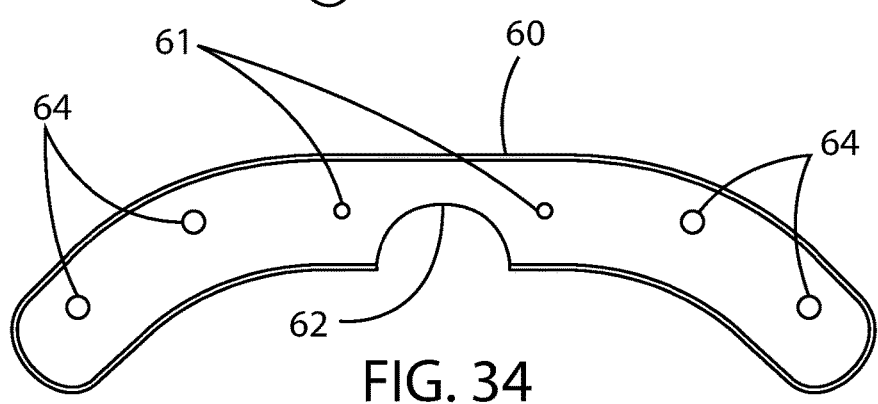
FIG. 34 is a front view of the first upper member for the sixth embodiment.

FIGS. 30 through 34 illustrate an alternative embodiment that collects a portion of the heated gas from the vent pipe 14 and directs the heated gas upwardly through a vertical segment 52 and out through a plurality of vents 64, 74 within an upper segment. The upper segment has a first length and is comprised of a tubular structure defining an upper passage. The cross sectional shape of the upper segment may be circular, oval, square and various other shapes. The first length of the upper segment is greater than a width of an upper opening of the roof vent pipe to prevent the upper segment from passing through the upper opening in the vent pipe 14. As shown in FIG. 32, the upper segment is horizontally aligned and is relatively transverse with respect to the vertical segment 52.

The upper segment includes a plurality of vents 64, 74 to discharge the heated gas. The plurality of vents 64, 74 may have various shapes and sizes (FIG. 32 illustrates the usage of smaller circular apertures for the vents 64, 74. The plurality of vents 64, 74 are distally spaced apart between opposing ends of the upper segment (the opposing ends of the upper segment are preferably closed but may be open). The vents 64, 74 allow for the safe discharge of gas from the vent pipe even if the upper opening 16 of the vent pipe 14 freezes over.

The vertical segment 52 has a second length that is preferably significantly longer than the first length of the upper segment. The vertical segment 52 extends downwardly from the upper segment as illustrated in FIGS. 30 and 32 of the figures. The vertical segment 52 has a lower end opposite of the upper segment and further includes a lower opening 51 in the lower end to receive the heated gas from the vent pipe. The vertical segment 52 is comprised of a tubular structure defining a vertical passage that receives the gas from the lower opening 51 of the vertical segment 52. The vertical passage of the vertical segment 52 is fluidly connected to the upper passage of the upper segment to transfer the heated gas from the vertical passage to the upper segment for discharge out through the vents 64, 74.

The upper segment includes a first portion extending outwardly in a first direction away from the vertical segment 52 and a second portion extending outwardly in a second direction (opposite of the first direction) away from the vertical segment 52 as illustrated in FIGS. 30 and 32 of the figures. The first portion and the second portion of the upper segment are preferably both downwardly curved to assist in guiding water downwardly and away from the vent pipe opening (e.g. ice that is melted is transferred away).

The plurality of vents 64, 74 may extend through a front portion or a rear portion of the upper segment. FIG. 31 illustrates the vents 64, 74 extending through both the front portion and the rear portion of the upper segment wherein in one embodiment the upper segment is comprised of a first upper member 60 and a second upper member.

The first upper member 60 and the second upper member are connected to an upper connector 50 wherein the upper connector 50 is connected to an upper end of the vertical segment 52. The first upper member 60 is attached to the upper connector 50 with first fasteners 66 and the second upper member is attached to the upper connector 50 with second fasteners 76 (extending through fasteners openings 61, 71 in the upper members 60, 70). Alternative methods of attachment may be used such as but not limited to welding. The upper connector 50 is preferably comprised of a T-shaped structure to fluidly connected the vertical segment 52 with the upper segment. The first upper member 60 and the second upper member include a first cutout 62 and a second cutout respectively that corresponds to the upper connector 50. Alternatively, the first upper member 60 and the second upper member may be directly connected to the vertical segment 52.

The first upper member 60 and the second upper member are preferably mirror images of one another but may have different shapes. The upper members 60, 70 form an upper passage when connected together.

FIG. 31 illustrates another alternative embodiment comprised of an extension tube 56 that is secured to the lower end of the vertical segment 52 by an extension connector 54 to effectively extend the length of the vertical segment 52 which may be preferable in certain situations. Extension fasteners 58 are used to attach the extension connector 54 between the extension tube 56 and the vertical segment 52. The extension connector 54 and the extension tube 56 are constructed of thermally conductive material such as metal (e.g. copper).

Unless otherwise defined, all technical and scientific terms used herein have the same meaning as commonly understood by one of ordinary skill in the art to which this invention belongs. Although methods and materials similar to or equivalent to those described herein can be used in the practice or testing of the anti-ice buildup system for roof vent pipes, suitable methods and materials are described above. All publications, patent applications, patents, and other references mentioned herein are incorporated by reference in their entirety to the extent allowed by applicable law and regulations. The anti-ice buildup system for roof vent pipes may be embodied in other specific forms without departing from the spirit or essential attributes thereof, and it is therefore desired that the present embodiment be considered in all respects as illustrative and not restrictive.

Any headings utilized within the description are for convenience only and have no legal or limiting effect.

What is claimed is:

1. A thermal conductor device to prevent ice buildup within an interior of a roof vent pipe, comprising:
    an upper segment having a first length, wherein the upper segment is comprised of a tubular structure defining an upper passage, wherein the upper segment and the upper passage are horizontally aligned and wherein the first length of the upper segment is greater than a width of an upper opening of the roof vent pipe;
    wherein the upper segment includes a plurality of vents; and
    a vertical segment having a second length, wherein the vertical segment extends downwardly from the upper segment, wherein the vertical segment has a lower end opposite of the upper segment, wherein the vertical segment is comprised of a tubular structure defining a vertical passage, and wherein the vertical passage of the vertical segment is fluidly connected to the upper passage of the upper segment;
    wherein the lower end includes a lower opening;
    wherein at least a portion of the upper segment is adapted to remain outside of the roof vent pipe and wherein at least a portion of the vertical segment is adapted to extend downwardly through the upper opening in the roof vent pipe;
    wherein the vertical segment and horizontal segment are constructed of a thermal conductive material;
    wherein the lower opening is adapted to receive a gas flowing upwardly through the roof vent pipe and wherein the plurality of vents are adapted to discharge the gas;
    wherein a width of the vertical segment is substantially less than a width of the upper opening and the interior of the roof vent pipe to allow for the gas flowing upwardly through the roof vent to pass around an outside of the vertical segment.

2. The thermal conductor device of claim 1, wherein the upper segment includes a first portion extending outwardly in a first direction away from the vertical segment and a second portion extending outwardly in a second direction away from the vertical segment, wherein the first direction is opposite of the second direction.

3. The thermal conductor device of claim 2, wherein the first portion and the second portion of the upper segment are both downwardly curved.

4. The thermal conductor device of claim 1, wherein the plurality of vents are distally spaced apart between opposing ends of the upper segment.

5. The thermal conductor device of claim 1, wherein the plurality of vents extend through a front portion or a rear portion of the upper segment.

6. The thermal conductor device of claim 1, wherein the plurality of vents extend through a front portion and a rear portion of the upper segment.

7. The thermal conductor device of claim 1, wherein the upper segment is comprised of a first upper member and a second upper member.

8. The thermal conductor device of claim 7, wherein the first upper member and the second upper member are connected to an upper connector, wherein the upper connector is connected to an upper end of the vertical segment.

9. The thermal conductor device of claim 8, wherein the upper connector is comprised of a T-shaped structure.

10. The thermal conductor device of claim 1, wherein the thermal conductive material is comprised of metal.

11. The thermal conductor device of claim 10, wherein the thermal conductive material is comprised of copper.

12. The thermal conductor device of claim 1, wherein the upper segment and the vertical segment are comprised of a unitary structure.

13. The thermal conductor device of claim 1, wherein the upper segment and the vertical segment form a substantially T-shaped structure.

14. The thermal conductor device of claim 1, wherein the vertical segment is elongated and straight.

15. The thermal conductor device of claim 1, wherein the vertical segment extends from a substantially center location of the upper segment.

16. The thermal conductor device of claim 1, wherein opposing ends of the upper segment are closed.

17. A thermal conductor device to prevent ice buildup within an interior of a roof vent pipe, comprising:
    an upper segment having a first length, wherein the upper segment is comprised of a tubular structure defining an upper passage and wherein the first length of the upper segment is greater than a width of an upper opening of the roof vent pipe;
    wherein the upper segment and upper passage are horizontally aligned;
    wherein the upper segment includes a plurality of vents, wherein the plurality of vents are distally spaced apart between opposing ends of the upper segment; and
    a vertical segment having a second length, wherein the vertical segment extends downwardly from the upper segment, wherein the vertical segment has a lower end opposite of the upper segment, wherein the vertical segment is comprised of a tubular structure defining a vertical passage, and wherein the vertical passage of the vertical segment is fluidly connected to the upper passage of the upper segment;
    wherein the upper segment includes a first portion extending outwardly in a first direction away from the vertical segment and a second portion extending outwardly in a second direction away from the vertical segment, wherein the first direction is opposite of the second direction; wherein the first portion and the second portion of the upper segment are both downwardly curved;
    wherein the lower end includes a lower opening;
    wherein at least a portion of the upper segment is adapted to remain outside of the roof vent pipe and wherein at least a portion of the vertical segment is adapted to extend downwardly through the upper opening in the vent pipe;
    wherein the vertical segment and horizontal segment are constructed of a thermal conductive material;
    wherein the lower opening is adapted to receive a gas flowing upwardly through the roof vent pipe and wherein the plurality of vents are adapted to discharge the gas;
    wherein a width of the vertical segment is substantially less than a width of the upper opening and the interior of the roof vent pipe to allow for the gas flowing upwardly through the roof vent to pass around an outside of the vertical segment.

18. The thermal conductor device of claim 17, wherein the plurality of vents extend through a front portion or a rear portion of the upper segment.

19. The thermal conductor device of claim 17, wherein the plurality of vents extend through a front portion and a rear portion of the upper segment.

20. A thermal conductor device to prevent ice buildup within an interior of a roof vent pipe, comprising:
    an upper segment having a first length, wherein the upper segment is comprised of a tubular structure defining an upper passage, wherein the upper segment and the upper passage are horizontally aligned and wherein the first length of the upper segment is greater than a width of an upper opening of the roof vent pipe;
    wherein the upper segment includes a plurality of vents; and
    a vertical segment having a second length, wherein the vertical segment extends downwardly from the upper segment, wherein the vertical segment has a lower end opposite of the upper segment, wherein the vertical segment is comprised of a tubular structure defining a vertical passage, and wherein the vertical passage of the vertical segment is fluidly connected to the upper passage of the upper segment;
    wherein the lower end includes a lower opening;
    wherein at least a portion of the upper segment is adapted to remain outside of the roof vent pipe and wherein at least a portion of the vertical segment is adapted to extend downwardly through the upper opening in the roof vent pipe;
    wherein the vertical segment and horizontal segment are constructed of a thermal conductive material;
    wherein the lower opening is adapted to receive a gas flowing upwardly through the roof vent pipe and wherein the plurality of vents are adapted to discharge the gas;
    wherein a width of the vertical segment is substantially less than a width of the upper opening and the interior of the roof vent pipe to allow for the gas flowing upwardly through the roof vent to pass around an outside of the vertical segment;
    wherein the upper segment includes a first portion extending outwardly in a first direction away from the vertical segment and a second portion extending outwardly in a second direction away from the vertical segment, wherein the first direction is opposite of the second direction;
    wherein the thermal conductive material is comprised of metal;
    wherein the upper segment and the vertical segment form a substantially T-shaped structure;
    wherein the vertical segment is elongated and straight.

* * * * *